(12) United States Patent
Oldani et al.

(10) Patent No.: US 7,225,727 B2
(45) Date of Patent: Jun. 5, 2007

(54) DEVICE FOR HEATING AND FROTHING A LIQUID, IN PARTICULAR MILK

(75) Inventors: Renzo Oldani, Villastanza Di Parabiago (IT); Roberto Rancilio, Villastanza Di Parabiago (IT)

(73) Assignee: Rancilio Macchine Per Caffe' S.p.A., Parabiago (IT)

( * ) Notice: Subject to any disclaimer, the term of this patent is extended or adjusted under 35 U.S.C. 154(b) by 572 days.

(21) Appl. No.: 10/276,835

(22) PCT Filed: May 17, 2001

(86) PCT No.: PCT/IB01/00861

§ 371 (c)(1),
(2), (4) Date: Dec. 16, 2002

(87) PCT Pub. No.: WO01/88187

PCT Pub. Date: Nov. 22, 2001

(65) Prior Publication Data

US 2003/0106433 A1    Jun. 12, 2003

(30) Foreign Application Priority Data

May 19, 2000  (IT)  ............................ TO2004A0462
May 19, 2002  (IT)  ............................ TO20000076 U

(51) Int. Cl.
A47J 31/40  (2006.01)
A47J 31/44  (2006.01)
A23C 9/00  (2006.01)

(52) U.S. Cl. .......................... 99/293; 99/323.1; 99/453
(58) Field of Classification Search ............... 99/323.1, 99/323.2, 293, 453, 452; 261/78.1, DIG. 76, 261/121.1, 126
See application file for complete search history.

(56) References Cited

U.S. PATENT DOCUMENTS 4,557,187 A * 12/1985 DePonti ........................ 99/279
4,803,920 A *  2/1989 Kowalics et al. ............. 99/348
5,233,915 A *  8/1993 Siccardi ........................ 99/293
5,339,725 A *  8/1994 De'Longhi ................... 99/293
5,427,816 A *  6/1995 Harlaux et al. ............. 426/614

* cited by examiner

Primary Examiner—Reginald L. Alexander
(74) Attorney, Agent, or Firm—Paul & Paul

(57) ABSTRACT

An automatic device for heating and frothing a liquid, in particular milk, comprises a container which is provided with an opening for the introduction of the liquid and is associated with a duct for introducing into the liquid pressurised steam for heating the liquid itself and creating turbulence therein, and air, which duct has, in an internal end portion, a set of openings or nozzles distributed along said end portion and is arranged so as to send steam into the liquid according to a predetermined trajectory.

26 Claims, 4 Drawing Sheets

DEVICE FOR HEATING AND FROTHING A LIQUID, IN PARTICULAR MILK

CROSS-REFERENCE TO RELATED APPLICATIONS

This application is filed under 35 U.S.C. 371 and is the National Stage of International Application No. PCT/IB01/00861 filed on May 17, 2001.

The present invention concerns a device for heating and frothing a liquid, in particular milk.

Preferably, the invention is applied in espresso coffee machines for bars, for producing frothy hot milk to be used e.g. in preparing cappuccinos, and the following description refers to that preferred application.

It is known that, in order to produce milk froth by means of espresso coffee machines, the operator utilises a container into which he pours a certain quantity of milk; then he introduces steam into the milk by means of a spout while stirring the container, so as to create a certain turbulence in the milk and incorporate the ambient air necessary to form the froth.

The characteristics and the quantity of the froth produced depend on the modalities of milk stirring and steam introduction, and therefore on the sensitivity and the skill of each operator. Thus, such characteristics, and therefore the characteristics of the cappuccino in which the frothy milk is used, change from one operator to another and may be wholly unsatisfactory for the client even if the operator judges them optimal.

Moreover, with the present technique, problems may also arise from the hygienic standpoint, due to the presence on the spout tip of milk crusts that are produced by successive frothing operations and that can remain exposed to air for a certain time, and to the use of milk residuals that are left in the container after a frothing operation and are heated again, possibly after addition of fresh cold milk.

Similar problems arise in case of beverages requiring heating, such as chocolate, tea, infusions, punches, etc., the preparation of which is wholly dependent on the operator's skill.

A partial solution of the above problems is the subject matter of Italian patent No. 1,236,535. That patent discloses a frothing device with a steam spout having a moving part that is manually operated for immersion into the liquid. The immersion depth is predetermined, so as to ensure a good constancy of the froth characteristics.

SUMMARY OF THE INVENTION

A first aim of the invention is to provide a heating and frothing device, which operates in more rational and definite manner, without making the result depend only on the skill of the person using the device.

Another aim of the invention is to provide an automatic heating and frothing device, which allows producing a froth with substantially constant characteristics and which does not give rise to the above mentioned hygienic problems.

The device according to the invention essentially comprises a container, acting as a heating and frothing chamber, which is provided with an opening for the introduction of the liquid to be processed and is associated with a duct for introducing pressurised steam into the liquid, for heating the liquid itself and creating turbulence therein.

The device according to the invention may be constructed both for manual operation and in an automatic version.

Advantageously, in the first case the device could be associated, if necessary, with a steam nozzle of a conventional coffee machine, whereas in the second case it will be directly embodied into the coffee machine.

BRIEF DESCRIPTION OF THE DRAWINGS

The invention will now be described in detail with particular reference to the accompanying drawings, given by way of non limiting example, in which.

DETAILED DESCRIPTION OF THE INVENTION

Figure 1:
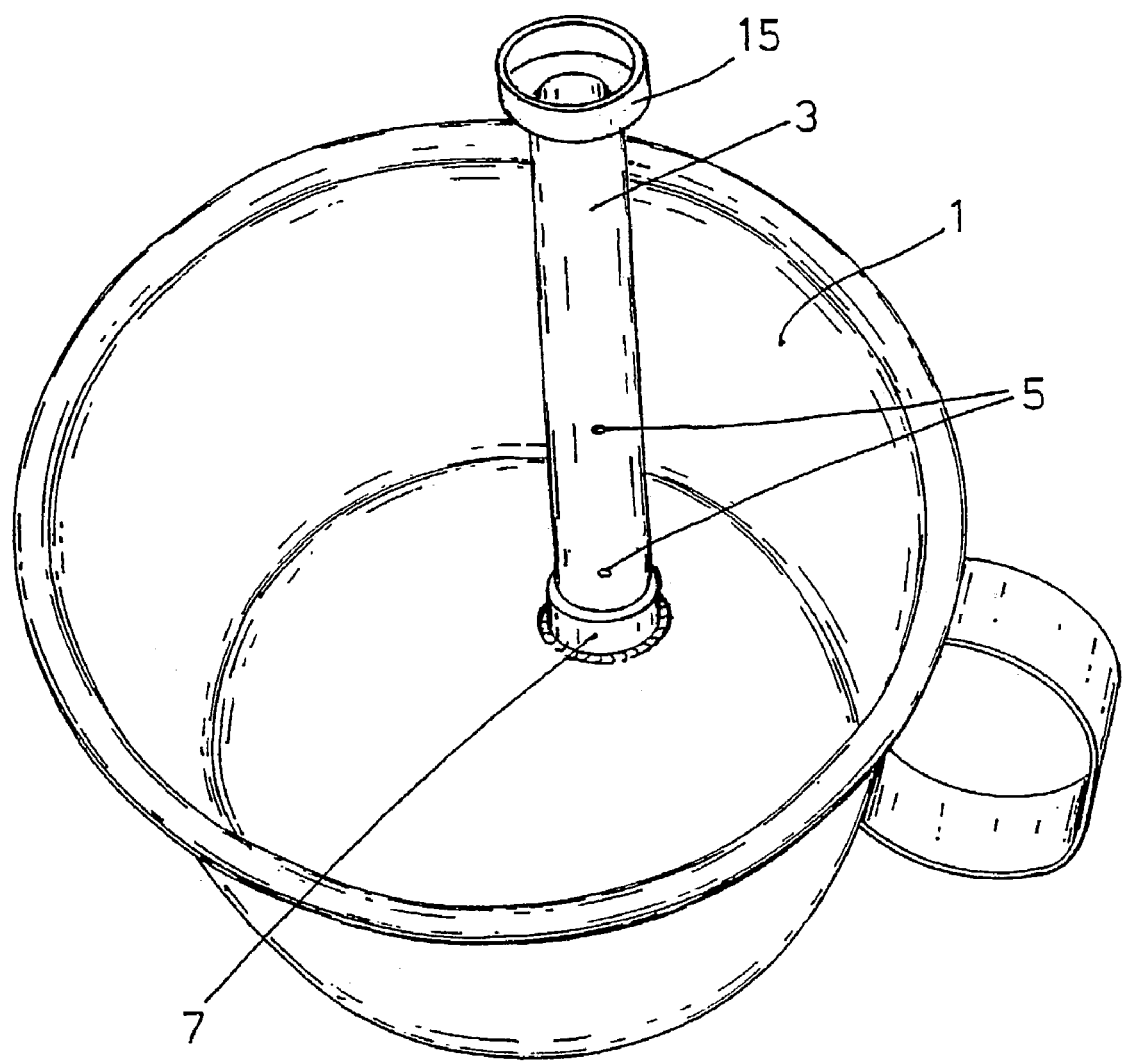
FIG. 1 as a perspective view of the container of the invention, with a steam-supplying duct applied thereto.
Figure 2:
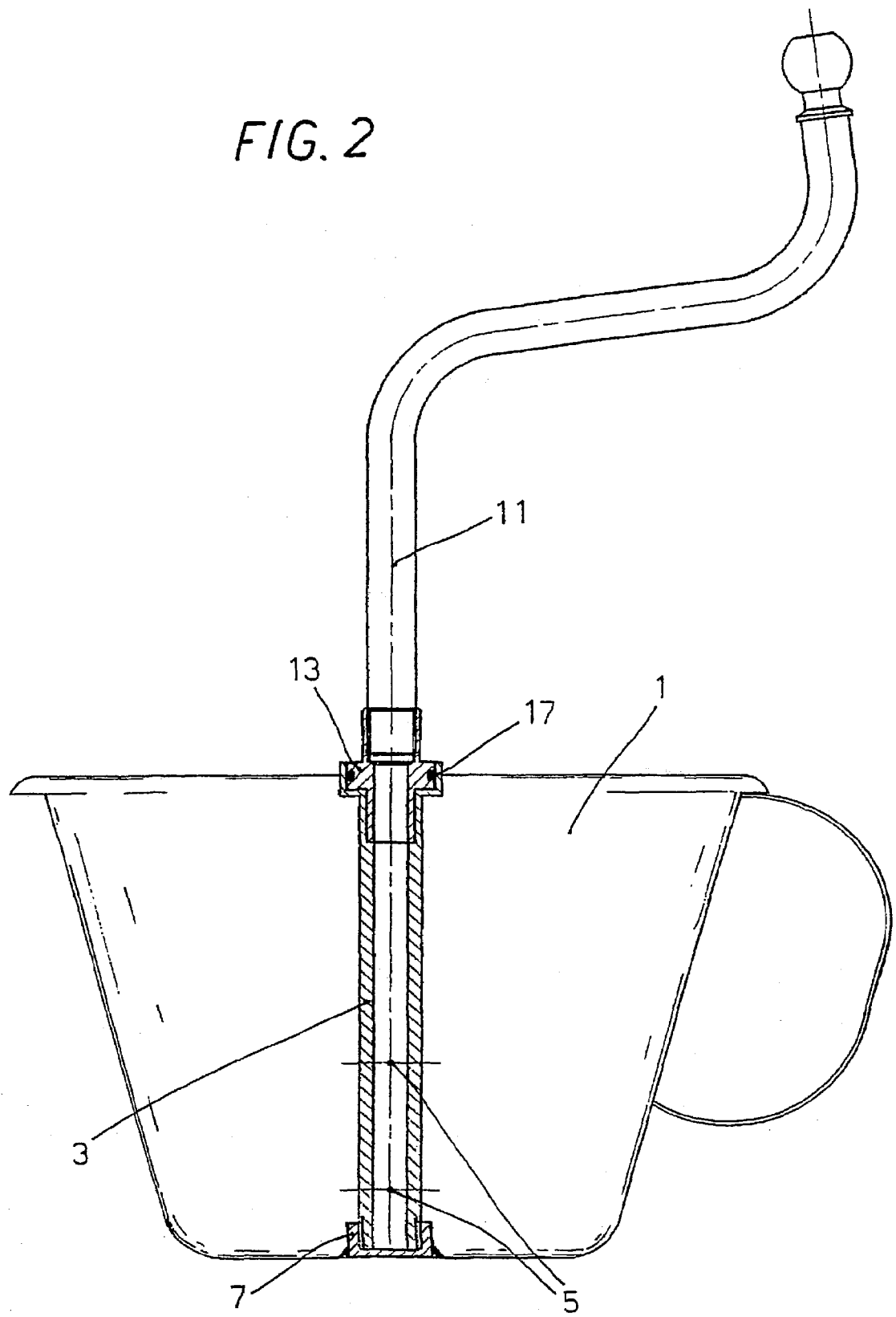
FIG. 2 is a side view, partly in cross section, of the container shown in FIG. 1 and coupled with a steam-supplying spout.
Figure 4:
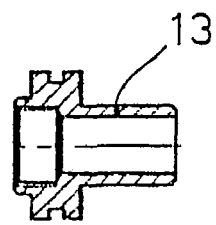
FIG. 4 is an axial cross-sectional view of the jack connecting the spout and the duct.
Figure 3:
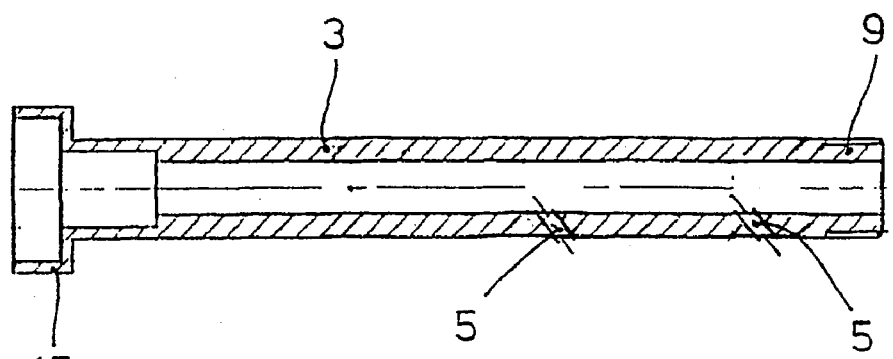
FIG. 3 is an axial cross-sectional view of the steam-supplying duct.
Figure 5:
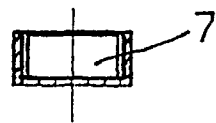
FIG. 5 is an axial cross-sectional view of the member securing the duct to the container bottom.

As clearly shown in FIGS. 1 to 5, the device of the invention essentially comprises an open container 1, of predetermined capacity, to the bottom of which a duct 3 is removably mounted so that its axis is parallel with the container axis.

Said duct 3 has a set of openings 5 of predetermined diameters, positions and orientation such that the openings are covered by the milk when this is poured in container 1 through its open side.

In the illustrated embodiment, two downward inclined openings 5 with a diameter of the order of 1 mm are provided. Said duct 3 is secured onto the bottom of container 1 by means of a threaded member 7, which is welded onto the bottom of container 1 and in which lower end 9 of duct 3 is screwed. Said duct 3 is adapted to receive in sealed manner steam spout 11 of the coffee machine (not shown). Said coupling between duct 3 and spout 11 is achieved through a jack 13, adapted to be fitted into upper end 15 of duct 3 with the interposition of an O-ring 17, so as to provide a seal between said duct 3 and said spout 11 of the coffee machine.

Jack 13 is so shaped as to provide a fastening preventing the two parts from becoming disconnected and steam from flowing out, what could be harmful to the operator.

Advantageously, jack 13 further provides a mechanical seal allowing use of the device without need of keeping it with the hands, by merely putting it on a working plane like that usually provided for putting the cups in espresso coffee machines.

A necessary condition for a good operation of the device is that the uppermost opening 5 is to be located some millimeters below the level of the milk to be frothed: this obviously entails availability of a set of containers 1 with a wide range of different capacities, rather than of a set of different positions for said openings 5.

Once the operation is complete, the operator actuates steam discharge and steam will flow out from said openings 5 thereby stirring the milk in container 1 to create the turbulence required to heat the milk and to embody the amount of external air required to produce froth.

After a few seconds of operation, the operator must stop steam delivery and disconnect duct 3 from spout 11 of the coffee machine, since he has obtained the desired result.

Figure 6:
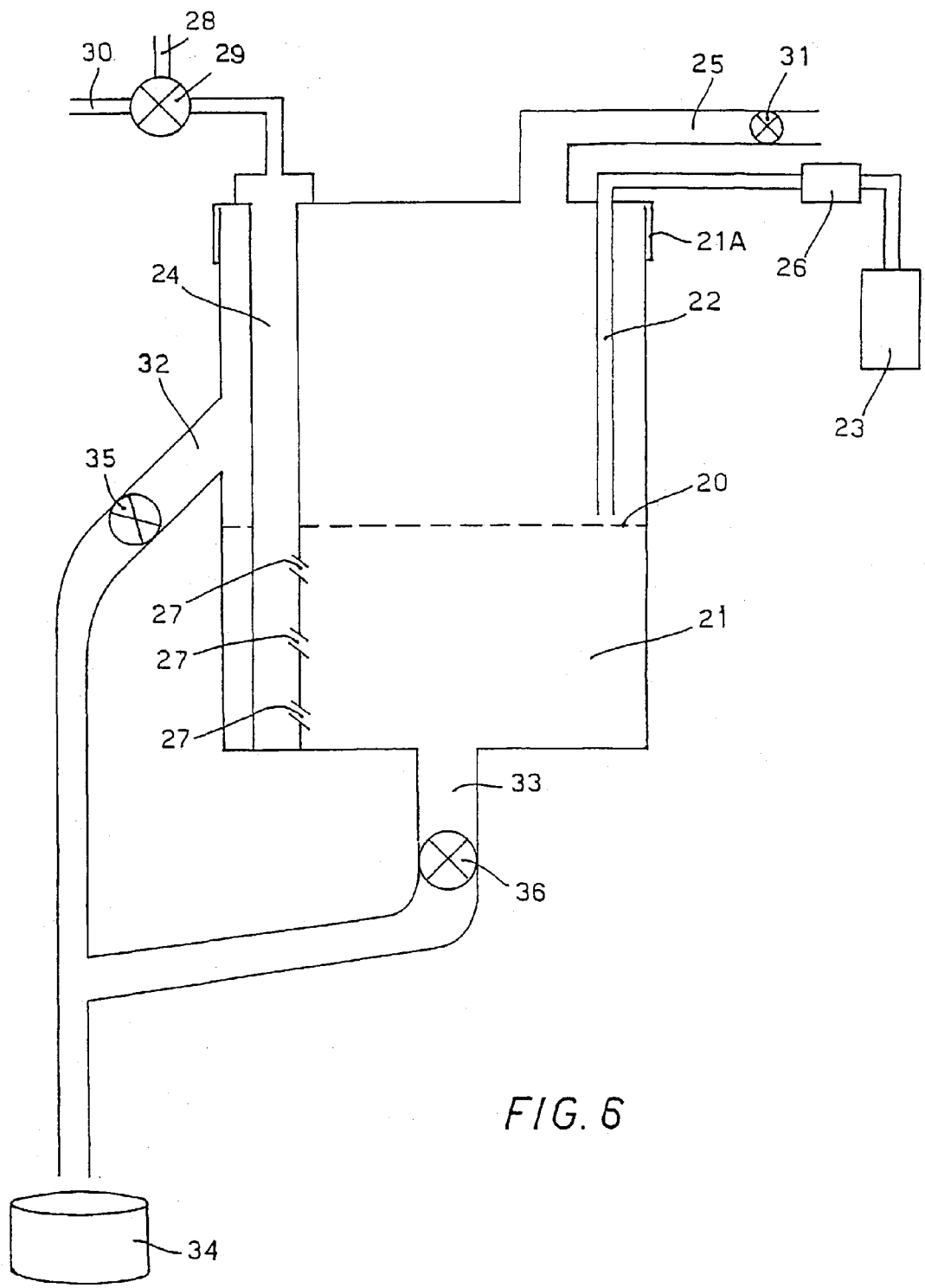
FIG. 6 schematically shows the device according to the invention in the automatic configuration.

Referring now to FIG. 6, the automatic device essentially comprises a closed container 21 forming a heating and frothing chamber. That chamber has a first inlet duct 22 for introducing milk coming from a vessel 23, a second inlet duct 24 for introducing pressurised steam and a third duct 25 for introducing air. Upper portion 21A of the chamber is mounted in sealed manner on the chamber body and can be removed to allow washing the chamber itself. The three inlet ducts penetrate into the chamber of container 21 through said upper portion, more particularly through the roof.

Milk can be transferred from vessel 23 to container 21 by gravity or, preferably, by means of a pump 26, e.g. a peristaltic pump, allowing introducing dosed amounts of milk.

Duct 24 extends over the whole height of the chamber of container 21 and has a plurality of radial openings or nozzles 27 for steam outflow in its lower section, for instance three nozzles as shown in the drawing. Nozzles 27 have a predetermined inclination, preferably a downward inclination, and they are distributed along said lower section so that the uppermost nozzle lies near the free surface 20 of the milk, but below that surface.

Pressurised steam, coming through a duct 28 from a source, not shown, in particular from the steam production unit provided in the espresso coffee machine, is fed to duct 24 through a two-way electrical valve 29. The second way of that valve allows supplying with steam other utilisation devices, e.g. the conventional steam spout, through a further duct 30.

A valve 31 in turn controls air feed through duct 25.

The chamber of container 21 further has two outlet ducts 32 and 33 for transferring froth and hot milk, respectively, to a cup 34 or other vessel. Duct 32 starts from the side wall of the chamber of container 21, at an height corresponding with the level of the milk to be processed, whereas duct 33 starts from the bottom of the chamber of container 21. Both ducts 32, 33 are equipped with respective valves 35, 36.

The operation cycle of the device is as follows:
- milk is introduced into the chamber of container 21 through duct 22, by gravity or by means of pump 26;
- electric valve 29 is operated so as to establish communication between ducts 28 and 24, and steam is introduced into milk through nozzles 27, thereby heating the milk and inducing turbulence therein;
- air inlet valve 31 is opened, whereby air mixes with the turbulent milk and creates froth;
- after a predetermined time, valve 35 is opened and froth begins flowing towards cup 34; in the meanwhile the system continues operating, thereby creating further milk froth and heating milk;
- air valve 31 is closed, milk introduction and heating being however continued;
- after a second predetermined time, milk supply is stopped and valve 36 is opened, thereby discharging hot milk towards cup 34; the formation, during inactivity times, of crusts or impurities that may alter subsequent operation cycles, is thus prevented.

The cycle can be started simply by pushing a button on the coffee machine of which the device is a fitting, and all cycle steps will automatically follow one another. The flow rates for steam and air and the heating and frothing times can be set in a calibration phase of the machine.

One can immediately appreciate that the invention solves the problems mentioned in the introduction: the operation, as said, is completely automatic; the product quality no longer depends on the skill and/or the sensitivity of the individual operator; thanks to the use of pump 26, it is possible to introduce into the chamber of container 21 just the exact milk amount required for a given operation; lastly, the parts contacting the milk (in particular, steam duct 24) no longer are exposed to the ambient atmosphere and thus they do not risk becoming polluted.

It is clear that the above description is given only by way of non-limiting example and that changes and modifications can be made without departing from the scope of the invention.

Thus, for instance, it is possible to equip the chamber of container 21 with a probe for detecting and adjusting the temperatures of the outgoing milk and froth, so as to allow supplying hotter or colder beverages depending on the client's wishes, or in general, supplying beverages of which the temperature does not depend on the temperature of the milk in vessel 23.

Moreover, it is possible to equip the chamber with a further steam inlet, which is similar to that consisting of duct 24 and which is fed through an own valve. That further inlet however will have openings 27 of which the number, the arrangement and the sizes are such that they do not give rise to turbulence, and it could be used when supplying mere hot milk, without froth, is desired. In such case the control means should exclude the air inlet and, of course, the froth outlet, from the operation cycle.

Moreover, even if reference has been made to the preparation of milk froth and hot milk in espresso coffee machines, the device can be used to froth and/or heat other liquids.

The possibility of controlling the device according to the invention allows providing for automatic washing cycles, of desired intensities and frequencies and automatically timed or manually actuated, which ensure an optimum cleanness of the chamber and the ducts: this is obtained by simply replacing vessel 23 by a vessel containing a suitable commercially available detergent.

The invention claimed is:

1. A device for heating and frothing a liquid comprising a container (1; 21), acting as a heating and frothing chamber, which is provided with an opening for the introduction of the liquid to be processed into said container (1; 21) and with a duct (3; 24) for introducing pressurised steam into the liquid contained in said container (1; 21), for heating the liquid and creating turbulence therein:

wherein said duct has at least one steam outlet opening inclined downwards, so that steam flows out in a substantially radial and downward inclined direction;

wherein said duct (3; 24) is fastened onto a bottom of said container (1; 21) so that an axis of said duct is parallel to an axis of said container (1; 21) and is equipped with a means for a sealed connection to a steam-supplying spout thus permitting steam from a steam supply to flow out from said at least one opening (5; 27), said at least one opening (5; 27) being provided as a set of openings (5; 27) adapted to be covered by the liquid when the liquid is poured into said container (1; 21) and steam introduction into the liquid thus creating conditions for frothing same; and wherein the sealed connection between said duct (3; 24) and the spout (11) is achieved through a jack (13), fitted into an upper end (15) of said duct (3; 24) with the interposition of an O-ring (17).

2. A device according to claim 1, wherein said duct (3; 24) is a substantially cylindrical body and comprises an open end for introducing pressurised steam into said duct (3; 24) and a closed end on an opposite side and wherein said at least one opening (5; 27) is provided on a lateral surface of said duct, arranged so as to send steam into the liquid according to a predetermined trajectory.

3. A device for heating and frothing a liquid comprising a container (1; 21), acting as a heating and frothing chamber, which is provided with an opening for the introduction of the liquid to be processed into said container (1; 21) and with a duct (3; 24) for introducing pressurised steam into the liquid contained in said container (1; 21), for heating the liquid and creating turbulence therein, said duct having at least one steam outlet opening:
 wherein said duct (3; 24) for introducing steam is fastened onto a bottom of said container (1; 21) so that an axis of said duct is parallel to an axis of said container (1; 21), and said duct is provided with a set of openings (5; 27) adapted to be covered by the liquid when the liquid is poured into said container (1; 21);
 wherein said duct (3; 24) is equipped with a means for a sealed connection with a steam-supplying spout thus permitting steam from a steam supply to flow out from said openings (5; 27), and steam introduction into the liquid thus creating conditions for frothing same; and
 wherein the sealed connection between said duct (3; 24) and the spout (11) is achieved through a jack (13), fitted into an upper end (15) of said duct (3; 24) with the interposition of an O-ring (17).

4. A device for heating and frothing a liquid comprising a container (1; 21), acting as a heating and frothing chamber, which is provided with an opening for the introduction of the liquid to be processed into said container (1; 21) and with a duct (3; 24) for introducing pressurised steam into the liquid contained in said container (1; 21), for heating the liquid and creating turbulence therein, said duct having at least one steam outlet opening:
 wherein said duct (3; 24) for introducing steam is fastened onto a bottom of said container (1; 21) so that an axis of said duct is parallel with an axis of said container (1; 21), and said duct is provided with a set of openings (5; 27) adapted to be covered by the liquid when the liquid is poured into said container (1; 21); and
 wherein said duct (3; 24) from which steam flows into the liquid to be frothed is removably fastened onto said bottom of said container (1; 21) by means of a threaded member (7), which is welded onto said bottom of the container (1; 21) and in which a lower end (9) of said duct (3; 24) is screwed.

5. A device according to claim 4, wherein said duct (3; 24) is a substantially cylindrical body and comprises an open end for introducing pressurised steam into said duct (3; 24) and a closed end on an opposite side and wherein said at least one opening (5; 27) is provided on a lateral surface of said duct, arranged so as to send steam into the liquid according to a predetermined trajectory.

6. A device according to claim 4, wherein said openings (5; 27) in the duct (3; 24) are inclined downwards, so that steam flows out in a substantially radial and downward inclined direction.

7. A device according to claim 4, wherein said duct (3; 24) is equipped with a means for a sealed connection to a steam-supplying spout thus permitting steam from a steam supply to flow out from said openings (5; 27) and steam introduction into the liquid thus creating conditions for frothing same.

8. A device according to claim 7, wherein the sealed connection between said duct (3; 24) and the spout (11) is achieved through a jack (13), fitted into an upper end (15) of said duct (3; 24) with the interposition of an O-ring (17).

9. A device for heating and frothing a liquid comprising a container (1; 21), acting as a heating and frothing chamber, which is provided with an opening for the introduction of the liquid to be processed into said container (1; 21) and with a duct (3; 24) for introducing pressurised steam into the liquid contained in said container (1; 21), for heating the liquid and creating turbulence therein, said duct having at least one steam outlet opening;
 wherein said duct (3; 24) is fastened to said container (1; 21);
 wherein said container (1; 21) is a closed container having a first, a second and a third inlet ducts (24, 22, 25) for introducing pressurised steam into the liquid for heating same and creating turbulence therein, introducing the liquid to be processed into said container (1; 21), and introducing air necessary to frothing into the turbulent liquid, respectively, and having a first and a second outlet ducts (32, 33) for discharging the froth and the heated liquid, respectively.

10. A device according to claim 9, further comprising an actuation means for automatically and sequentially starting the introduction of liquid, steam and, if required, air, for controlling amounts being introduced and for discharging the froth and/or the hot liquid at the end of an operation cycle.

11. A device according to claim 10, wherein said second inlet duct (22) is connected to a pump (26) for transferring dosed amounts of the liquid from a vessel (23).

12. A device according to claim 9 or 10, wherein said first inlet duct (24) has, in a lower section of said first inlet duct (24) located inside said container (1; 21), a set of steam outlet nozzles (5; 27), which are distributed along said lower section and are arranged so as to send steam into the liquid according to a predetermined trajectory.

13. A device according to claim 12, wherein said first inlet duct (24) is connected with a source of pressurised steam through a first way of a two-way valve (29), to which a second way is connected with a second steam duct (30) intended to supply another utilisation device with pressurised steam.

14. A device according to claim 9, wherein said first, second and third inlet ducts (24, 22, 25) penetrate into said container (1; 21) through a chamber roof.

15. A device according to claim 14, wherein an upper portion of said container (1; 21), including said roof, is removably mounted.

16. A device according to claim 10, wherein said third inlet duct (25) and said first and second outlet ducts (32, 33) are provided with respective control valves (31, 35, 36) operated by said actuation means at predetermined instants and for predetermined periods.

17. A device according to claim 9, wherein said container (1; 21) is provided with a means for detecting and adjusting the temperature of the liquid within the container (1; 21), to allow supplying the liquid and/or a froth at a desired temperature, independent of the temperature of the liquid in the vessel (23).

18. A device according to claim 9, wherein said container (21) is provided with a further inlet duct for introducing pressurised steam, which is provided with nozzles in a quantity and having cross-sections and being arranged such that said nozzles do not create turbulence in the liquid, and which is fed with steam rather than feeding steam to said first inlet duct (24), and in that said actuation means are adapted to cause execution of an operation cycle in which steam introduction takes place through said further inlet duct, and air introduction and froth discharge are inhibited.

19. A device according to claim 12, wherein an uppermost one of said openings (5; 27) is located a few millimeters below the level of the liquid to be frothed.

20. An espresso coffee machine comprising means for producing steam and equipped with a device for heating and frothing a liquid according to any one of claims 9, 10, 11, 14, 15, 16, 17 or 18.

21. An espresso coffee machine comprising means for producing steam and equipped with a device for heating and frothing a liquid according to claim 12.

22. An espresso coffee machine comprising means for producing steam and equipped with a device for heating and frothing a liquid according to claim 13.

23. A device according to any one of claims 1 or 3, wherein the steam-supplying spout is the steam spout of an espresso coffee machine.

24. An espresso coffee machine comprising a steam-supplying spout, wherein a free end of the spout is equipped with a jack (13) adapted to be fittingly coupled with a device made in accordance with claims 1 or 3.

25. A device according to claims 3 or 4, wherein an uppermost one of said openings (5; 27) is located a few millimeters below the level of the liquid to be frothed.

26. A device according to claims 1, 3, 4 or 9 wherein at least two openings (5; 27) are provided and each opening has a diameter of about 1 mm.

* * * * *